(12) United States Patent
Hochi

(10) Patent No.: US 7,767,734 B2
(45) Date of Patent: Aug. 3, 2010

(54) RUBBER COMPOSITION FOR BEAD APEX AND TIRE USING SAME

(75) Inventor: Kazuo Hochi, Kobe (JP)

(73) Assignee: Sumitomo Rubber Industries, Ltd., Hyogo (JP)

(*) Notice: Subject to any disclaimer, the term of this patent is extended or adjusted under 35 U.S.C. 154(b) by 0 days.

(21) Appl. No.: 12/224,333

(22) PCT Filed: Apr. 25, 2007

(86) PCT No.: PCT/JP2007/058954

§ 371 (c)(1),
(2), (4) Date: Aug. 25, 2008

(87) PCT Pub. No.: WO2007/132653

PCT Pub. Date: Nov. 22, 2007

(65) Prior Publication Data

US 2009/0014109 A1    Jan. 15, 2009

(30) Foreign Application Priority Data

May 17, 2006   (JP)   ............................ 2006-137864

(51) Int. Cl.
*C08J 5/14*   (2006.01)
*B60C 15/06*   (2006.01)

(52) U.S. Cl. ........................ 523/153; 152/541

(58) Field of Classification Search ............... 523/153
See application file for complete search history.

(56) References Cited

U.S. PATENT DOCUMENTS 6,013,737 A * 1/2000 Takagishi et al. ........ 525/332.7
6,939,526 B2 * 9/2005 Fukuda et al. .............. 423/448

FOREIGN PATENT DOCUMENTS

| EP | 1508590 A1 | 2/2005 |
|---|---|---|
| EP | 1582561 A1 | 10/2005 |
| JP | 5-247268 A | 9/1993 |
| JP | 2001-164051 A | 6/2001 |
| JP | 2001-279020 A | 10/2001 |
| JP | 2001-316526 A | 11/2001 |
| JP | 2001316526 A * | 11/2001 |
| JP | 2003-63206 A | 3/2003 |
| JP | 2004-143366 A | 5/2004 |
| JP | 2004269587 A * | 9/2004 |
| JP | 2004-352995 A | 12/2004 |
| JP | 2004-359095 A | 12/2004 |
| JP | 2005-23240 A | 1/2005 |
| JP | 2005 325308 | 11/2005 |
| JP | 2006 117784 | 11/2006 |

OTHER PUBLICATIONS

Translation of JP2001316526, Nov. 2001.*
Translation of JP2004269587, Sep. 2004.*
Extended European Search Report in corresponding EP Application EP 07742389 dated Jan. 10, 2010.

* cited by examiner

*Primary Examiner*—Ling-Siu Choi
*Assistant Examiner*—Hui Chin
(74) *Attorney, Agent, or Firm*—Birch, Stewart, Kolasch & Birch, LLP

(57) ABSTRACT

The present invention can provide a rubber composition for a bead apex comprising 20 to 120 parts by weight of a silica and 5 to 80 parts by weight of a graphite on the basis of 100 parts by weight of a rubber component comprising a natural rubber in an amount of not less than 30% by weight, use of which makes it possible to consider an effect on environment, prepare for decrease in petroleum supply in future, and reduce rolling resistance and improve steering stability, and a tire prepared by using it.

11 Claims, 1 Drawing Sheet

RUBBER COMPOSITION FOR BEAD APEX AND TIRE USING SAME

This application is the National Phase under 35 U.S.C. §371 of PCT International Application No. PCT/JP2007/058954 which has an International filing date of Apr. 25, 2007, which claims priority to Japanese Application No. 2006-137864, which has a filing date of May 17, 2006; the entire contents of which are hereby incorporated by reference.

TECHNICAL FIELD

The present invention relates to a rubber composition for a bead apex and a tire prepared by using it.

BACKGROUND ART

Recently, as automobile performances have been improved and road network has developed, steering stability of tires is also required. In order to obtain superior steering stability of tires, it is necessary to improve rigidity of a bead apex and there has been developed rubber compositions for a bead apex comprising a large quantity of carbon black.

However, although high rigidity can be obtained by using fillers, there are also disadvantages that heat is easily generated during tire running because of increase in loss tangent (tan δ), durability is damaged by thermal fatigue and rolling resistance of a tire is increased (rolling resistance property is reduced).

Further, environmental problems have been recently emphasized and regulations on $CO_2$ emission have been made more rigorous. Further, since petroleum resources are finite and supply quantity thereof has been reduced year by year, petroleum price is predicted to surge in future and there is a limit in use of raw materials derived from petroleum resources such as carbon black. Consequently, assuming a case of depletion of petroleum in future, it is necessary to use resources other than petroleum such as a natural rubber, silica and calcium carbonate for a rubber composition for a bead apex. However, in such a case, there is a problem that equal or better properties such as rigidity of a bead apex cannot be obtained compared with the case of conventionally used petroleum resources.

JP2003-63206A discloses raw materials for a tire to cope with the case where depletion of petroleum is assumed to occur, but there is not disclosed a rubber composition for a bead apex that reduces rolling resistance adequately and is superior in steering stability.

DISCLOSURE OF INVENTION

It is an object of the present invention to provide a rubber composition for a bead apex, use of which makes it possible to consider an effect on environment, provide for decrease in supply of petroleum resources, reduce rolling resistance and improve steering stability, and a tire having a bead apex prepared by using it.

The present invention relates to a rubber composition for a bead apex comprising 20 to 120 parts by weight of a silica and 5 to 80 parts by weight of a graphite based on 100 parts by weight of a rubber component comprising a natural rubber in an amount of 30 to 100% by weight.

The average particle diameter of the aforementioned graphite is preferably 3 to 50 μm.

Further, the present invention relates to a tire having a bead apex prepared by using the rubber composition for a bead apex.

BEST MODE FOR CARRYING OUT THE INVENTION

Figure 1:
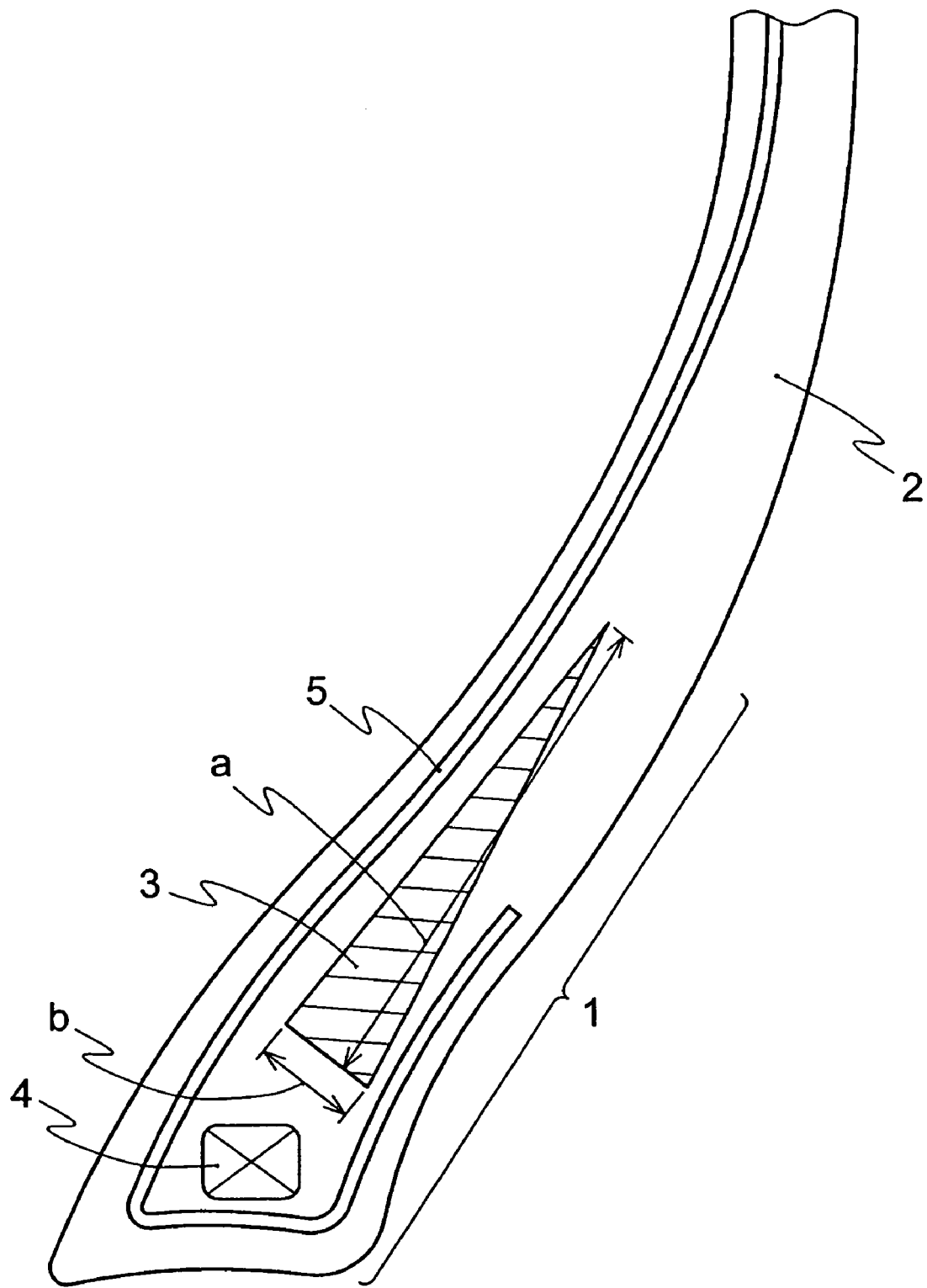
FIG. 1 is a sectional view of a bead portion of a pneumatic tire prepared by using the rubber composition for a bead apex of the present invention.

The rubber composition for a bead apex of the present invention comprises a rubber component, a silica and a graphite.

The rubber component comprises a natural rubber (NR). Since NR is contained, an effect on environment can be considered, decrease in petroleum supply in future can be prepared for, and further, rolling resistance is reduced and hardness, durability and fatigue resistance property can be improved.

As for NR, NR of grades such as RSS#3 and TSR20 that are generally used in the rubber industry can be used.

A content of NR in the rubber component is not less than 30% by weight, preferably not less than 50% by weight. When the content of NR is less than 30% by weight, an effect on environment cannot be considered, decrease in petroleum supply in future cannot be prepared for, and further, rolling resistance is not adequately reduced and durability and fatigue resistance property are hardly improved. Further, the content of NR is not more than 100% by weight, preferably not more than 90% by weight, more preferably not more than 80% by weight from the viewpoint of excellent steering stability and rolling resistance.

As for the rubber component, together with NR, other diene rubbers can be suitably used. Examples of the diene rubbers other than NR are an epoxidized natural rubber (ENR), styrene-butadiene rubber (SBR), butadiene rubber (BR), styrene-isoprene rubber (SIR), butyl rubber (IIR), halogenated butyl rubber (X-IIR), and a halogenated product of a copolymer of isomonoolefin and p-alkylstyrene. These can be used in combination. Among these, ENR, SBR, BR and IR are preferable because they can reduce rolling resistance and improve hardness, durability and fatigue resistance property, and ENR is more preferable because an effect on environment can be considered and decrease in petroleum supply in future can be prepared for.

As for ENR, a commercially available ENR may be used and NR may be epoxidized to be used. A method of epoxidizing NR is not particularly limited and exemplified are methods such as a chlorohydrin method, a direct oxidation method, a hydrogen peroxide method, an alkylhydroperoxide method and a peracid method. For example, as the peracid method, a method of reacting NR with an organic peracid such as peracetic acid or performic acid can be mentioned.

A content of ENR in the rubber component is preferably not more than 70% by weight, more preferably not more than 50% by weight because low heat build-up property is excellent and heat generation is reduced. Further, the content of ENR is preferably not less than 0% by weight, more preferably not less than 10% by weight, further preferably not less than 20% by weight from the viewpoint of excellent steering stability and rolling resistance.

The silica is not particularly limited and there can be used silica being used generally in the rubber industry.

A content of the silica is not less than 20 parts by weight, preferably not less than 30 parts by weight, more preferably not less than 40 parts by weight based on 100 parts by weight of the rubber component. When the content of the silica is less than 20 parts by weight, an effect on environment cannot be considered, decrease in petroleum supply in future cannot be prepared for and hardness adequate for a rubber composition for a bead apex cannot be obtained. Further, the content of the silica is not more than 120 parts by weight, preferably not more than 100 parts by weight, more preferably not more than 90 parts by weight. When the content of the silica exceeds 120 parts by weight, processing of rubber is difficult.

It is an object of the rubber composition for a bead apex of the present invention to consider an effect on environment and prepare for decrease in petroleum supply in future. Therefore, it is preferable not to use carbon black, which is usually used as a reinforcing filler.

Examples of reinforcing fillers are clay, alumina, talc, calcium carbonate, magnesium carbonate, aluminum hydroxide, magnesium hydroxide, magnesium oxide and titanium oxide. One or two or more of these reinforcing fillers can be used in combination with the silica.

A silane coupling agent is preferably used together with the silica for the rubber composition for a bead apex of the present invention. Particularly, an organic silane coupling agent represented by the following general formula is preferable because kneading processability and extrusion processability of the rubber when kneading at 130 to 160° C. can be improved.

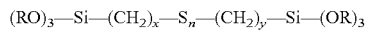

$(RO)_3—Si—(CH_2)_x—S_n—(CH_2)_y—Si—(OR)_3$ wherein R is a linear or branched alkyl group having 1 to 8 carbon atoms; x and y are the same or different and each is an integer of 1 to 8; and n is an integer of 2 to 8.

Examples of compounds satisfying the aforementioned formula are sulfide silane coupling agents such as bis(3-triethoxysilylpropyl)tetrasulfide, bis(2-triethoxysilylethyl)tetrasulfide, bis(4-triethoxysilylbutyl) tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide and bis(4-trimethoxysilylbutyl)disulfide.

A content of the silane coupling agent is preferably not less than 4 parts by weight, more preferably not less than 8 parts by weight based on 100 parts by weight of the silica from the viewpoint of excellent processability of rubber at kneading and extruding. Further, the content of the silane coupling agent is preferably not more than 20 parts by weight, more preferably not more than 15 parts by weight from the viewpoint of cost reduction and an excellent effect of improving processability of the rubber at kneading and extruding.

When only white fillers such as silica are contained as reinforcing fillers, since a white filler has a low light shielding effect and light is easily transmitted, light reaches to an inner layer of a bead apex and deterioration of a rubber is accelerated. Although a shielding effect has been obtained by using carbon black, carbon black is a raw material derived from petroleum resources and is not preferable. Accordingly, in the present invention, the above-mentioned problem of white fillers can be solved by using a graphite which has a similar effect and is a non-petroleum resource.

In the present invention, the graphite is a cleavable graphite having a crystal structure of hexagonal plate-like form, and dose no encompass carbon black or the like.

An average particle diameter of the graphite is preferably not less than 3 μm, more preferably not less than 5 μm, further preferably not less than 10 μm because an adequate hardness is obtained. Further, the average particle diameter of the graphite is preferably not more than 50 μm, more preferably not more than 20 μm because adequate strength is obtained, the graphite hardly becomes a trigger of fracture in the rubber, and excellent tear strength and flex crack growth resistance can be gained.

A content of the graphite is not less than 5 parts by weight, preferably not less than 10 parts by weight based on 100 parts by weight of the rubber component. When the content of the graphite is less than 5 parts by weight, an adequate reinforcing effect cannot be obtained. Further, the content of the graphite is not more than 80 parts by weight, preferably not more than 50 parts by weight. When the content of the graphite exceeds 80 parts by weight, durability and fatigue resistance property are lowered. In the present invention, since the content of the graphite is 5 to 80 parts by weight, rolling resistance can be reduced and durability and fatigue resistance property can be improved.

It is preferable that the rubber composition for a bead apex of the present invention contains further a thermosetting resin. Examples of the thermosetting resins are phenol resins and cresol resins.

Examples of the phenol resins are an alkylphenol resin, and oil-modified phenol resins such as a cashewoil-modified phenol resin and phenol resins modified with another oil.

From the viewpoint of high hardness, phenol resins are preferable as a thermosetting resin.

A content of the thermosetting resin is preferably not less than 1 part by weight, more preferably not less than 3 parts by weight based on 100 parts by weight of the rubber component because an adequate hardness for the rubber composition for a bead apex can be obtained. Further, the content of the thermosetting resin is preferably not more than 20 parts by weight, more preferably not more than 15 parts by weight, because an unvulcanized rubber is not too hard and exhibits an excellent processability.

An object of the rubber composition for a bead apex of the present invention is to consider an effect on environment and prepare for decrease in petroleum supply in future. Therefore, it is preferable that an aromatic oil is not contained, and adequate properties such as steering stability and rolling resistance can be obtained even though oils are not used.

In the rubber composition for a bead apex of the present invention, additives such as a vulcanizing agent such as sulfur, a vulcanization accelerator, wax, various antioxidants, stearic acid and zinc oxide that are usually used in the tire industry can be suitably compounded, in addition to the aforementioned rubber components, silica, reinforcing fillers, silane coupling agents, graphite and thermosetting resins.

The rubber composition for a bead apex of the present invention is prepared by a usual process. Namely, the aforementioned rubber component, silica, carbon black, and optional other additives are kneaded using a Banbury mixer, a kneader or an open roll, and the resulting kneaded product is then vulcanized to obtain the rubber composition for a bead apex of the present invention.

The rubber composition for a bead apex of the present invention is used particularly as a bead apex among tire members.

The tire of the present invention can be produced by a usual method using the rubber composition for a bead apex of the present invention. Namely, the rubber composition for a bead apex of the present invention in which the aforementioned compounding agents are compounded according to necessity is extruded and processed into a shape of a bead apex of a tire at an unvulcanized stage and then is laminated with other tire members to obtain an unvulcanized tire. The unvulcanized tire is subjected to heating and pressurizing in a vulcanizer to obtain the tire of the present invention.

FIG. 1 is a sectional view of the bead portion of the tire of the present invention having a bead apex prepared by using the rubber composition for a bead apex of the present invention. The tire has a pair of bead portions 1 formed on a pair of sidewall portions 2 linked at both sides of the tread and a carcass 5, both edge portions of which are turned up at the respective bead cores 4 of the bead portions 1. A bead apex 3 is a portion that is positioned in the folded part of the carcass 5 and extends in the longitudinal direction of the sidewall 2 as shown in FIG. 1. In the FIGURE of the bead apex 3, "a" represents a height of the bead apex and "b" represents a thickness of the bead apex. It is preferable that variations in height and thickness are small.

The tire prepared by using the rubber composition for a bead apex of the present invention can be made as an ecological tire, use of which makes it possible to consider an effect on environment, and prepare for decrease in petroleum supply in future.

EXAMPLES

The present invention is explained in detail based on Examples, but the present invention is not limited only to these.

Various chemicals used in Examples and Comparative Examples are explained below in detail.

Natural rubber (NR): RSS#3 (made in the Kingdom of Thailand)

Graphite: CP (average particle diameter: 19 μm) available from Nippon Graphite Industries, Co., Ltd.

Silica: VN3 (BET: 175 $m^2$/g) available from Degussa GmbH

Silane coupling agent: Si75 (bis(triethoxysilylpropyl)disulfide) available from Degussa GmbH Thermosetting resin: Curable phenol resin "SUMILITE RESIN PR12686" available from Sumitomo Bakelite Co., Ltd.

Stearic acid: STEARIC ACID "TSUBAKI" available from NOF CORPORATION

Zinc oxide: available from Mitsui Mining & Smelting Co., Ltd.

Antioxidant: ANTIGENE 6C (N-(1,3-dimethylbutyl)-N'-phenyl-p-phenylenediamine) available from Sumitomo Chemical CO., LTD.

Sulfur: available from Tsurumi Chemical Industry Co., Ltd.

Vulcanization accelerator NS: NOCCELER NS (N-tert-butyl-2-benzothiazolylsulfenamide) available from OUCHISHINKO CHEMICAL INDUSTRIAL CO., LTD.

Vulcanization accelerator H: NOCCELER H (hexamethylenetetramine) available from OUCHISHINKO CHEMICAL INDUSTRIAL CO., LTD.

Examples 1 to 3 and Comparative Examples 1 to 4

According to the compounding prescription shown in Table 1, chemicals other than sulfur and a vulcanization accelerator were kneaded under the condition of 150° C. for 4 minutes using a 1.7 L Banbury mixer manufactured by Kobe Steel, Ltd., to obtain kneaded products. Sulfur and a vulcanization accelerator were added to the kneaded products obtained, and then kneaded under the condition of 80° C. for 4 minutes using a biaxial roller, to obtain unvulcanized rubber compositions. Further, the obtained unvulcanized rubber compositions were molded into a shape of a bead apex and the resulting molded rubber compositions are then pasted with other tire members to obtain unvulcanized tires. The unvulcanized tires were then vulcanized under the conditions of 150° C. and 25 kgf (245. 16625N) for 35 minutes to obtain test radial tires (tire size: 195/65R15, H range) of Examples 1 to 3 and Comparative Examples 1 to 4.

(Steering Stability)

The test radial tires were loaded on all axles of a vehicle (FF2000 cc of domestic production) and in-vehicle running was conducted on a test course. Steering stability was evaluated by sensory evaluation of a driver. Here, the evaluation was carried out with 10 points at maximum and relative evaluation was conducted referring steering stability of Comparative Example 1 as 6 points. The larger the grading of steering stability is, the more superior it is.

(Rolling Resistance)

The torque due to resistance (rolling resistance) was measured by rolling the aforementioned test radial tires on a drum. Rolling resistance index of Comparative Example 1 was referred to as 100 and rolling resistance of each compounding was represented by an index according to the following equation. The larger the rolling resistance index is, the lower the rolling resistance is and the more excellent the rolling resistance property is.

(Rolling resistance index)=(Rolling resistance of Comparative Example 1)/(Rolling resistance of each compounding)×100

Evaluation results of the aforementioned tests are shown in Table 1.

TABLE 1

| | Example | | | Comparative Example | | | |
|---|---|---|---|---|---|---|---|
| | 1 | 2 | 3 | 1 | 2 | 3 | 4 |
| Amounts (part by weight) | | | | | | | |
| NR | 100 | 100 | 70 | 100 | 100 | 100 | 20 |
| ENR | — | — | 30 | — | — | — | 80 |
| Graphite | 15 | 50 | 15 | — | 2 | 10 | — |
| Silica | 70 | 20 | 70 | 90 | 90 | 150 | 90 |
| Silane coupling agent | 5.6 | 2.5 | 5.6 | 7.2 | 7.2 | 1.2 | 7.2 |
| Thermosetting resin | 5 | 5 | 5 | 5 | 5 | 5 | 5 |
| Stearic acid | 1.5 | 1.5 | 1.5 | 1.5 | 1.5 | 1.5 | 1.5 |
| Zinc oxide | 3 | 3 | 3 | 3 | 3 | 3 | 3 |
| Antioxidant | 2 | 2 | 2 | 2 | 2 | 2 | 2 |
| Sulfur | 3 | 3 | 3 | 3 | 3 | 3 | 3 |
| Vulcanization accelerator NS | 2.5 | 2.5 | 2.5 | 2.5 | 2.5 | 2.5 | 2.5 |
| Vulcanization accelerator H | 0.5 | 0.5 | 0.5 | 0.5 | 0.5 | 0.5 | 0.5 |

TABLE 1-continued

|  | Example | | | Comparative Example | | | |
| --- | --- | --- | --- | --- | --- | --- | --- |
|  | 1 | 2 | 3 | 1 | 2 | 3 | 4 |
| Evaluation results | | | | | | | |
| Steering stability | 6.5 | 7 | 7 | 6 | 6 | 6.5 | 6 |
| Rolling resistance | 104 | 106 | 105 | 100 | 100 | 86 | 91 |

INDUSTRIAL APPLICABILITY

According to the present invention, there can be provided a rubber composition for a bead apex comprising the specified amounts of a specific rubber component, silica and graphite, use of which makes it possible to consider an effect on environment, provide for decrease in petroleum supply in future, and further reduce rolling resistance and improve steering stability, and a tire prepared by using it.

The invention claimed is:

1. A rubber composition for a bead apex, which comprises:
   20 to 120 parts by weight of a silica,
   5 to 80 parts by weight of a graphite, and
   1 to 20 parts by weight of a thermosetting resin,
   wherein the thermosetting resin is phenol resin and/or cresol resin on the basis of 100 parts by weight of a rubber component comprising a natural rubber in an amount of 100% by weight.

2. The rubber composition for a bead apex of claim 1, wherein an average particle diameter of the graphite is 3 to 50 μm.

3. A tire having a bead apex formed from the rubber composition for a bead apex of claim 1.

4. A rubber composition for a bead apex, which comprises:
   20 to 120 parts by weight of a silica and
   5 to 80 parts by weigh of a graphite,
   on the basis of 100 parts by weight of a rubber component consisting of a natural rubber and an epoxidized natural rubber.

5. A rubber composition for a bead apex, which comprises:
   20 to 120 parts by weight of a silica and
   5 to 80 parts by weigh of a graphite,
   on the basis of 100 parts by weight of a rubber component comprising a natural rubber in an amount of 30 to 90% by weight and an epoxidized natural rubber in an amount of 70 to 10% by weight.

6. A tire having a bead apex formed from the rubber composition for a bead apex of claim 4.

7. A tire having a bead apex formed from the rubber composition for a bead apex of claim 5.

8. The tire of claim 3, wherein an average particle diameter of the graphite is 10 to 20 μm and wherein the silica is present in an amount of 40 to 90 parts by weight, and the graphite is present in an amount of 10 to 50 parts by weight, on the basis of 100 parts by weight of a rubber component.

9. The tire of claim 6, wherein an average particle diameter of the graphite is 10 to 20 μm and wherein the silica is present in an amount of 40 to 90 parts by weight, and the graphite is present in an amount of 10 to 50 parts by weight, on the basis of 100 parts by weight of a rubber component.

10. The tire of claim 7, wherein an average particle diameter of the graphite is 10 to 20 μm and wherein the silica is present in an amount of 40 to 90 parts by weight, and the graphite is present in an amount of 10 to 50 parts by weight, on the basis of 100 parts by weight of a rubber component.

11. The tire of claim 3, wherein an average particle diameter of the graphite is 19 to 50 μm.

* * * * *